United States Patent
Matsui (10) Patent No.: US 12,526,158 B2
(45) Date of Patent: Jan. 13, 2026

(54) MEMORY SYSTEM AND METHOD FOR SIGNATURE VERIFICATION OF FIRMWARE

(71) Applicant: Kioxia Corporation, Tokyo (JP)

(72) Inventor: Hajime Matsui, Yokohama Kanagawa (JP)

(73) Assignee: KIOXIA CORPORATION, Tokyo (JP)

(*) Notice: Subject to any disclaimer, the term of this patent is extended or adjusted under 35 U.S.C. 154(b) by 112 days.

(21) Appl. No.: 18/536,003

(22) Filed: Dec. 11, 2023

(65) Prior Publication Data

US 2024/0250831 A1    Jul. 25, 2024

(30) Foreign Application Priority Data

Jan. 25, 2023    (JP) ................ 2023-009280

(51) Int. Cl.
    *H04L 9/32*       (2006.01)
    *G06F 8/65*       (2018.01)
    *G06F 21/57*      (2013.01)

(52) U.S. Cl.
    CPC ............ *H04L 9/3247* (2013.01); *G06F 8/65* (2013.01); *G06F 21/575* (2013.01); *G06F 2221/034* (2013.01)

(58) Field of Classification Search
    CPC ....... H04L 9/3247; G06F 8/65; G06F 21/575; G06F 2221/034; G06F 21/572
    See application file for complete search history.

(56) References Cited

U.S. PATENT DOCUMENTS

| | | | |
|---|---|---|---|
| 10,447,483 B1* | 10/2019 | Su ................ | H04L 9/3226 |
| 2020/0097658 A1* | 3/2020 | Samuel ............ | G06F 11/0793 |
| 2020/0302061 A1* | 9/2020 | Rizos ............. | G06F 3/0683 |
| 2021/0182398 A1* | 6/2021 | Schack ........... | G06F 8/654 |
| 2022/0078012 A1 | 3/2022 | Inoue | |
| 2022/0209950 A1 | 6/2022 | Gray et al. | |
| 2022/0278833 A1 | 9/2022 | Nix | |
| 2023/0221949 A1* | 7/2023 | Lan ............... | G06F 21/64 |
| | | | 717/168 |
| 2023/0401316 A1* | 12/2023 | Suryanarayana ..... | G06F 21/572 |

(Continued)

FOREIGN PATENT DOCUMENTS

| | | | | |
|---|---|---|---|---|
| CN | 115828273 A | * | 3/2023 | ........ G06F 21/572 |
| CN | 120217346 A | * | 6/2025 | ........ G06F 21/44 |

(Continued)

*Primary Examiner* — Christopher A Revak
(74) *Attorney, Agent, or Firm* — Maier & Maier, PLLC (57) ABSTRACT

According to one embodiment, a controller includes a CPU and an accelerator which performs signature verification using a first signature of a first scheme. When updating first firmware to second firmware to which a second signature of a second scheme is assigned, the controller performs the signature verification of the second firmware based on the second signature assigned to the second firmware by the CPU, generates the first signature for the second firmware, and replaces the second signature assigned to the second firmware with the generated first digital signature. When booting the second firmware, the controller performs the signature verification of the second firmware based on the first signature assigned to the second firmware by the accelerator.

14 Claims, 6 Drawing Sheets

(56) References Cited

U.S. PATENT DOCUMENTS

2024/0028734 A1* 1/2024 Savage ................. G06F 21/575
2024/0403496 A1* 12/2024 Goodson, II ............ G06F 21/81

FOREIGN PATENT DOCUMENTS

| | | |
|---|---|---|
| JP | 2022-45614 A | 3/2022 |
| WO | 2021/029173 A1 | 2/2021 |
| WO | 2022/045007 A1 | 3/2022 |

* cited by examiner

MEMORY SYSTEM AND METHOD FOR SIGNATURE VERIFICATION OF FIRMWARE

CROSS-REFERENCE TO RELATED APPLICATIONS

This application is based upon and claims the benefit of priority from Japanese Patent Application No. 2023-009280, filed Jan. 25, 2023, the entire contents of which are incorporated herein by reference.

FIELD

Embodiments described herein relate generally to a memory system and a method.

BACKGROUND

In a solid state drive (SSD) incorporating a NAND flash memory (hereinafter referred to as flash memory), a controller that controls the flash memory operates according to a program description referred to as firmware. The firmware is stored in the flash memory along with a digital signature, and the controller performs a signature verification of the firmware with the digital signature to start the firmware when, for example, the SSD is powered on or reset. The controller prevents falsified firmware from being booted, by this signature verification. The controller prevents the signature verification of the firmware from prolonging an SSD boot time by incorporating a hardware accelerator for signature verification.

In addition, even when the firmware is updated, the controller also performs the signature verification of the firmware with the digital signature by inputting new firmware to which digital signature is assigned. The controller prevents unauthorized firmware from being incorporated, by this signature verification.

Recently, quantum computers have been focused, and the digital signature applicable to post-quantum cryptography is expected to become more widely used in the future. However, SSDs including only hardware accelerators that perform signature verification using digital signatures inapplicable to post-quantum cryptography are not capable of the signature verification of new firmware to which a digital signature applicable to post-quantum cryptography is assigned.

DETAILED DESCRIPTION

Embodiments will be described hereinafter with reference to the accompanying drawings.

In general, according to one embodiment, the memory system includes a nonvolatile memory and a controller. The controller controls the nonvolatile memory. The controller includes a CPU and an accelerator. The accelerator performs signature verification using a first digital signature of a first signature scheme. When updating first firmware stored in the nonvolatile memory to second firmware to which a second digital signature of a second signature scheme is assigned, the controller executes a program of performing signature verification with the second digital signature by the CPU to perform signature verification of the second firmware based on the second digital signature assigned to the second firmware by the CPU; generates the first digital signature for the second firmware; and replaces the second digital signature assigned to the second firmware with the generated first digital signature, and updates the first firmware to the second firmware. When booting the second firmware stored in the nonvolatile memory, the controller performs the signature verification of the second firmware based on the first digital signature assigned to the second firmware, by the accelerator, and performs the second firmware by the CPU.

Figure 1:
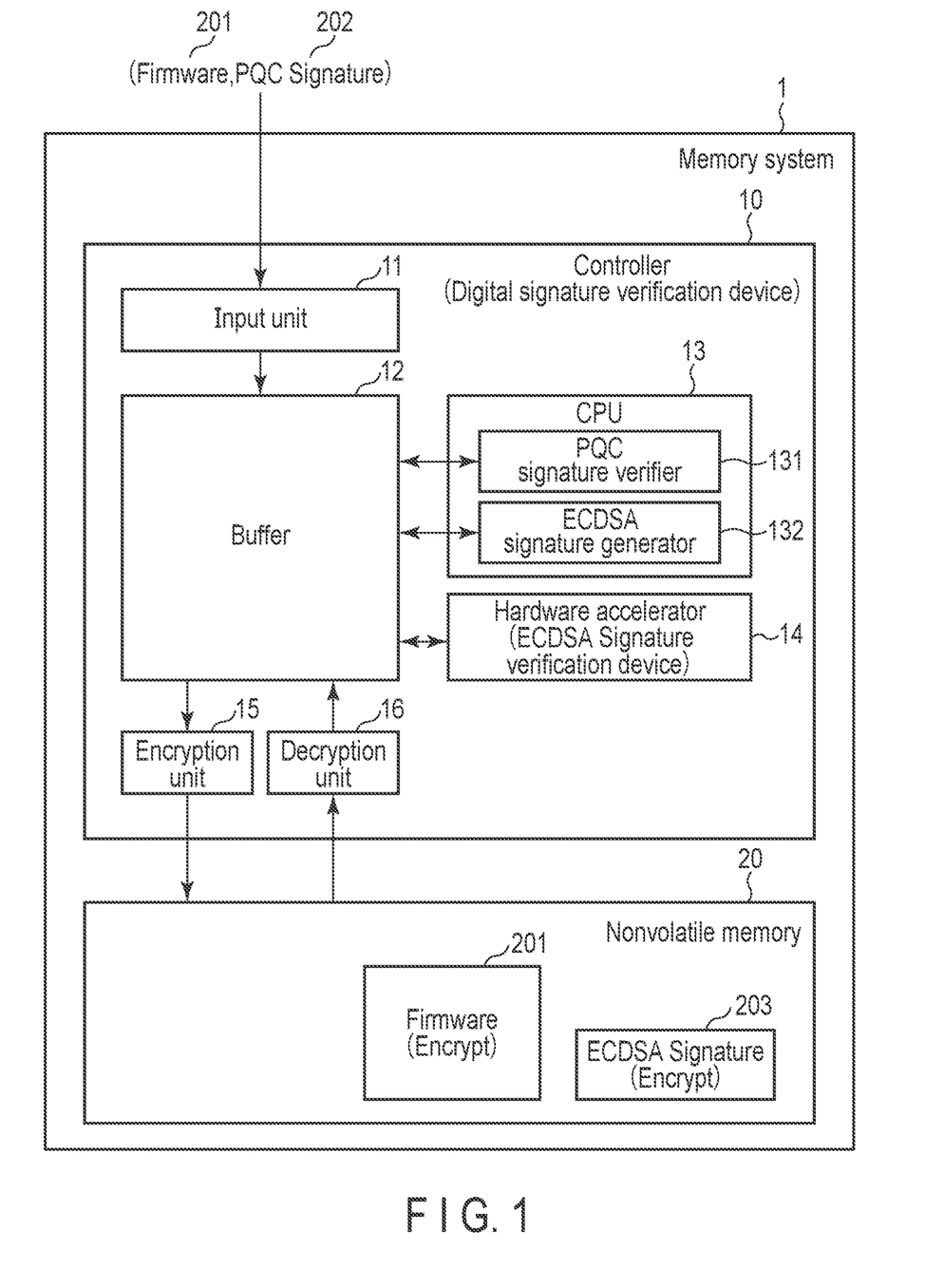
FIG. 1 is a diagram showing an example of a configuration of a memory system according to the embodiment.

FIG. 1 is a diagram showing an example of a configuration of a memory system 1 according to the embodiment.

The memory system 1 can be realized as, for example, an SSD. The memory system 1 includes a controller 10 and a nonvolatile memory 20. When the memory system 1 is realized as an SSD, the nonvolatile memory 20 is a flash memory.

The controller 10 controls the nonvolatile memory 20. The controller 10 boots firmware embedded to control the nonvolatile memory 20 when the memory system 1 is powered on or reset. The controller 10 performs signature verification of the firmware at an appropriate time so as not to perform falsified firmware or incorporate unauthorized firmware.

The startup time period of the memory system 1 may be limited. For this reason, the controller 10 includes a hardware accelerator 14 that can perform the signature verification of firmware at a high speed. In the memory system 1 of the embodiment, it is assumed that the hardware accelerator 14 in the controller 10 is, for example, a signature verification device performing the signature verification by digital signatures inapplicable to post-quantum cryptography, such as Elliptic Curve Digital Signature Algorithm (ECDSA) signatures. In other words, the hardware accelerator 14 cannot perform the signature verification using the digital signatures applicable to post-quantum cryptography, which are referred to as Post-Quantum Cryptography (PQC) signatures or the like.

The post-quantum cryptography is a generic term of secure cryptographic schemes for quantum computers, and schemes such as CRYSTALS-DILITHIUM, FALCON, and SPHINCS+ have been selected as secure digital signature schemes for quantum computers and their standardization work has been promoted in the standardization by National Institute of Standards and Technology (NIST).

Therefore, the memory system 1 of the embodiment has, for example, a mechanism for accelerating the signature verification of firmware in order to satisfy the constraints on the startup time, even when the application of post-quantum cryptography is started by providing firmware via a network and the firmware assigned the digital signature applicable to post-quantum cryptography is updated, and this point will be described later in detail.

Note that verifying the signature of firmware may be hereinafter referred to as verifying the digital signature (assigned to the firmware).

The controller 10 includes an input unit 11, a buffer 12, a CPU 13, an encryption unit 15, and a decryption unit 16, in addition to the above-described hardware accelerator 14, as components related to the signature verification of firmware. In this case, the hardware accelerator 14 is, for example, an ECDSA signature verification device that verifies the signature of firmware 201 with ECDSA signatures. In addition to ECDSA signatures, there are other digital signatures such as RSA signatures as the digital signatures inapplicable to post-quantum cryptography. In other words, the hardware accelerator 14 may be an RSA signature verification device that performs signature verification of the firmware 201 with RSA signatures. In this case, an ECDSA signature generator 132 to be described later is an RSA signature generator.

The ECDSA signature is a digital signature scheme based on the difficulty of inverse operation of scalar multiplication of points on an elliptic curve, and uses as a public key dG a point on the elliptic curve obtained by applying the scalar multiplication of the elliptic curve to a private key d, which is a scalar, with point G on the elliptic curve as a parameter. When generating the signature, the scheme calculates hash value h of firmware m, calculates kG from the secret information k by elliptic curve scalar multiplication to represent the x coordinate of kG as r, and calculates $s=(rd+h) \cdot k^{-1}$ (mod n) and represents signatures as r and s. n is the order of point G. In addition, when verifying the signature, the scheme calculates the hash value h of firmware m, calculates $(s^{-1} \cdot r \pmod{n})dG+(s^{-1} \cdot h \pmod{n}) \cdot G$ using the parameter G, the public key dG, and the signatures r and s, represents its x coordinate as r' and confirms that r=r'.

$$(s^{-1} \cdot r(\bmod n)) \cdot dG + (s^{-1} \cdot h(\bmod n)) \cdot G$$

is calculated as $$^*u = s^{-1} \cdot r \pmod{n}$$
$$^*v = s^{-1} \cdot h \pmod{n}$$
$$^*u \cdot dG + v \cdot G.$$

At this time, a scalar or the coordinates of a point on elliptic curve are multiple-length integers such as 256 bits or 384 bits, and one of the characteristics is that four arithmetic operations for multiple-length integers need to be performed on a finite field.

In other words, since remainder operations on multiple-length integers such as 256 bits or 384 bits are indispensable for the process of ECDSA signatures, the signatures need to be processed in every 32 bits or 64 bits when processed by CPU 13 using a program. In contrast, the hardware accelerator 14 is formed of logic and a flip-flop (FF) that can perform remainder operations on multiple-length integers. Therefore, the hardware accelerator 14 can process the ECDSA signatures faster than that in a case of processing by the CPU 13 using a program.

When updating the firmware 201, the input unit 11 receives new firmware 201 of an updated version and a PQC signature 202 assigned to the firmware 201 from the host which is a personal computer or the like. The firmware 201 input to the input unit 11 is already encrypted by common key cryptography.

The buffer 12 is a volatile storage medium, for example, DRAM, which provides the CPU 13 with a work area. The firmware 201 and the PQC signature 202 input from the input unit 11 are temporarily stored in the buffer 12.

The CPU 13 executes various programs including the firmware 201. In the memory system 1 of the embodiment, for example, once transition of providing the firmware 201 via a network to the application of the post-quantum cryptography has been determined, a program for constructing a PQC signature verifier 131 and an ECDSA signature generator 132 in the controller 10 is incorporated in advance, by providing the firmware 201 to which an ECDSA signature is assigned, before starting providing the firmware 201 to which the PQC signature is assigned. Alternatively, for example, after transition of providing the firmware 201 via a network to the application of post-quantum cryptography has been determined, the firmware 201 including a program for constructing the PQC signature verifier 131 and the ECDSA signature generator 132 in the controller 10 may be written to the nonvolatile memory 20 or the like in advance, prior to shipment of the memory system 1 (including no hardware accelerator which performs signature verification using a digital signature applicable to the post-quantum cryptography).

The PQC signature verifier 131 verifies the signature of the firmware 201 with the PQC signature 202, which is a digital signature applicable to the post-quantum cryptography. The signature verification of the firmware 201 is performed on the encrypted firmware 201. Since this signature verification is performed by the CPU 13 according to the program description, much time is taken as compared to the signature verification using the hardware accelerator 14. However, when the firmware 201 is updated, it is acceptable that the time required to perform this signature verification becomes slightly longer unlike the time when the memory system 1 is powered on or reset. If the signature verification of the firmware 201 using the PQC signature verifier 131 fails, the controller 10 terminates updating the firmware 201 with an error.

For example, FALCON, one of the PQC signatures, is a digital signature scheme based on the NTRU lattice, where polynomial matrix A is a public key and polynomial matrix B satisfying B×At=0 is a private key. When signatures are generated, a polynomial c is obtained by hash calculation for the conjunction of a random number r and firmware m, the secret key B is used to sample z centered at $t=(c\ 0)B^{-1}$ and, in $(s_1\ s_2)=(t-z)B$, sampling is repeated if $(s_1\ s_2)$ is not short or $(r, s_2)$ is used as a signature if $(s_1\ s_2)$ is short. When the signature is verified, a polynomial c is obtained by hash calculation for the conjunction of signature r and firmware m, and $s_1=c-s_2h$ is calculated using the public key A=(1 h) to confirm that $(s_1\ s_2)$ is short. At this time, one feature of this process is that c, t, z, $s_1$, and $s_2$ are high-dimensional polynomials and that multiplication of high-dimensional polynomials needs to be performed.

The ECDSA signature generator 132 generates an ECDSA signature 203 to be assigned to the firmware 201 using the above-described calculation instead of the PQC signature 202. The controller 10 performs the generation of the ECDSA signature 203 using the ECDSA signature generator 132 when the signature verification of the firmware 201 using the PQC signature verifier 131 is successful. Incidentally, in the memory system 1 of the embodiment in which the controller 10 includes the hardware accelerator 14 that verifies the signature of the firmware 201 with the ECDSA signatures, the function to generate the ECDSA signature 203 may be incorporated in the hardware accelerator 14, instead of constructing the ECDSA signature generator 132 by programs. Alternatively, the function to generate the ECDSA signature 203 may be incorporated in the controller 10 as a hardware accelerator other than the hardware accelerator 14.

The encryption unit 15 encrypts the ECDSA signature 203 generated by the ECDSA signature generator 132 using, for example, common key cryptography. The controller 10 stores the encrypted firmware 201 and ECDSA signature 203 in the nonvolatile memory 20.

A scheme that is secure for quantum computers is used as the common key cryptography. For example, AES can be used. A common key of the common key cryptography is, for example, embedded in the hardware of the memory system 1 and cannot be read or falsified from the outside. A different common key may be able to be held for each device (memory system 1) using eFuse or Physically Unclonable Function (PUF). The resistance to side-channel attacks using statistical methods can be increased by using a different common key for each device. Thus, vulnerability of security caused by replacing a digital signature applicable to the post-quantum cryptography with a digital signature inapplicable to the post-quantum cryptography can be covered by performing the encryption based on common key cryptography. In other words, attacks from quantum computers can be prevented.

In contrast, the decryption unit 16 decrypts the encrypted firmware 201 and the ECDSA signature 203 encrypted by the encryption unit 15 using the common key cryptography. The controller 10 decrypts the ECDSA signature 203 by the decryption unit 16 when the memory system 1 is powered on or reset. The decrypted ECDSA signature 203 is temporarily stored in the buffer 12.

At this point, since the digital signature assigned to the firmware 201 has been replaced from the PQC signature 202 to the ECDSA signature 203, the controller 10 can perform the signature verification of the firmware 201 by the hardware accelerator 14. The controller 10 performs the signature verification of the firmware 201 for the encrypted firmware 201. If the signature verification is successful, the controller 10 decrypts the firmware 201 by the decryption unit 16. The decrypted firmware 201 is stored in the buffer 12.

Incidentally, the controller 10 may be configured to perform the signature verification of the firmware 201 for the decrypted firmware 201, after the decryption of the firmware 201 using the decryption unit 16, at any time when the memory system 1 is powered on or reset or when the firmware 201 is updated.

The memory system 1 of the embodiment can thereby accelerate the signature verification of the firmware 201.

Figure 2:
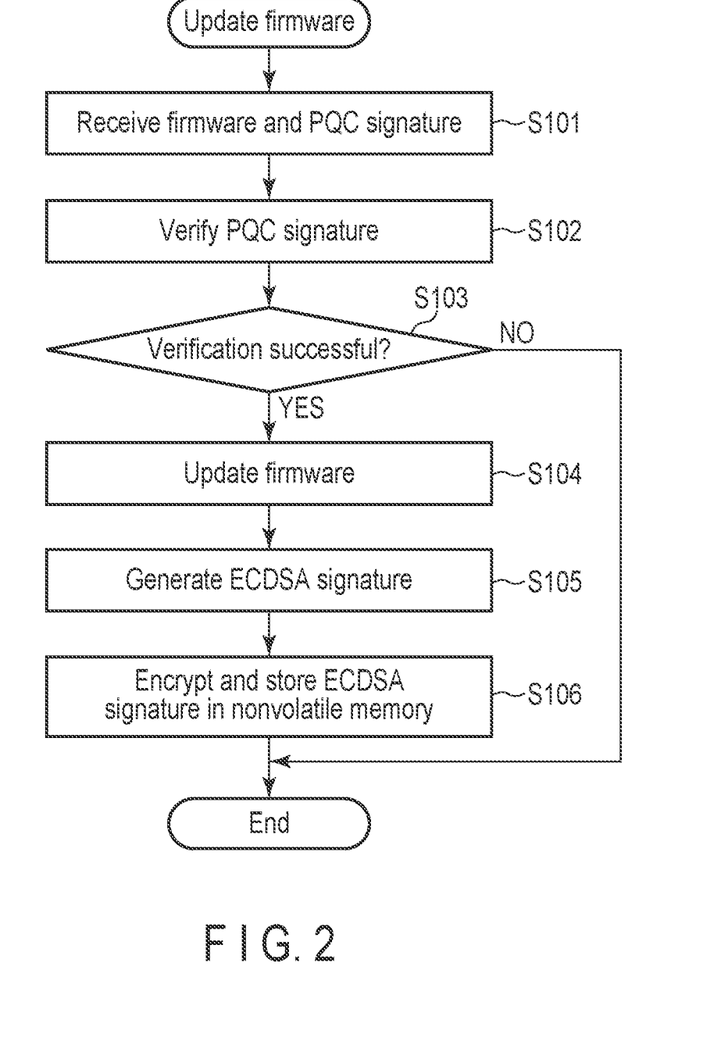
FIG. 2 is a flowchart showing an operation procedure at the time of updating firmware of the memory system according to the embodiment.

FIG. 2 is a flowchart showing the operation procedure at the time of updating the firmware 201 of the memory system 1 of the embodiment.

The controller 10 receives the firmware 201 and the PQC signature 202 (S101). The controller 10 verifies the PQC signature 202 (S102). In other words, the controller 10 performs the signature verification of the firmware 201 with the PQC signature 202. This verification is performed by the PQC signature verifier 131, i.e., the CPU 13, while spending some time required.

If the verification is successful (S103: YES), the controller 10 updates the firmware 201 (S104). The controller 10 generates the ECDSA signature 203 for the updated firmware 201 instead of the PQC signature 202 assigned at the time of input (S105). The controller 10 encrypts and stores the ECDSA signature 203 in the nonvolatile memory 20 (S106).

If the verification fails (S103: NO), the controller 10 terminates updating the firmware 201 with an error.

Figure 3:
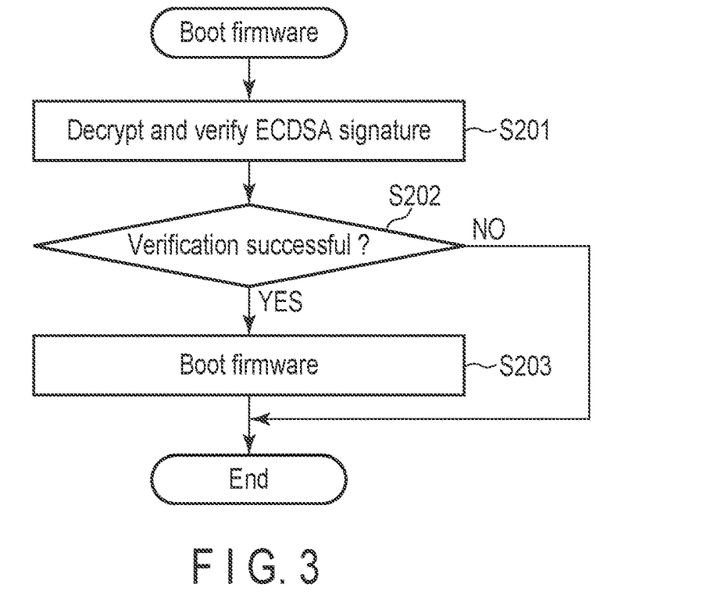
FIG. 3 is a flowchart showing an operation procedure at the time of booting the firmware of the memory system according to the embodiment.

FIG. 3 is a flowchart showing the operation procedure at the time of booting the firmware 201 of the memory system 1 of the embodiment. The time of booting the firmware 201 is, i.e., the time when the memory system 1 is powered on or reset.

The controller 10 decrypts and verifies the ECDSA signature 203 (S201). In other words, the controller 10 performs the signature verification of the firmware 201 using the ECDSA signature 203 decrypted by the decryption unit 16. This verification is performed at high speed by the hardware accelerator 14.

If the verification is successful (S202: YES), the controller 10 boots the firmware 201 (S203). In contrast, if the verification fails (S202: NO), the controller 10 terminates the error without booting the firmware 201.

Figure 4:
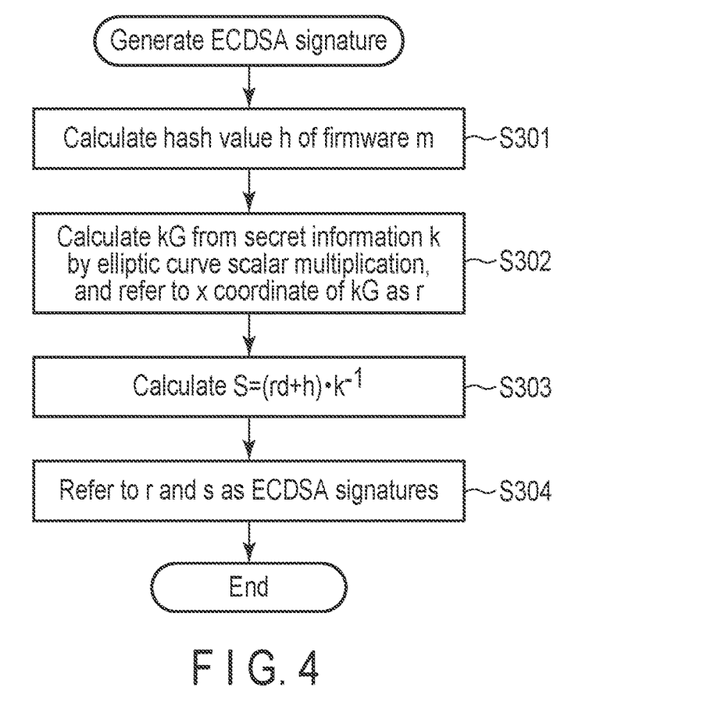
FIG. 4 is a flowchart showing an operation procedure at the time of generating an ECDSA signature of the memory system according to the embodiment.

FIG. 4 is a flowchart showing the operation procedure at the time of generating the embodiment during ECDSA signature 203 of the memory system 1 of the embodiment. In other words, the flowchart is a flowchart showing a process flow of the ECDSA signature generator 132.

The ECDSA signature generator 132 calculates the hash value h of the firmware m (S301). The ECDSA signature generator 132 calculates kG from the secret information k by elliptic curve scalar multiplication and refers to the x coordinate of kG as r (S302).

The ECDSA signature generator 132 calculates $S=(rd+h) \cdot k^{-1}$ (S303). The ECDSA signature generator 132 refers to r and s as ECDSA signatures (S304).

Figure 5:
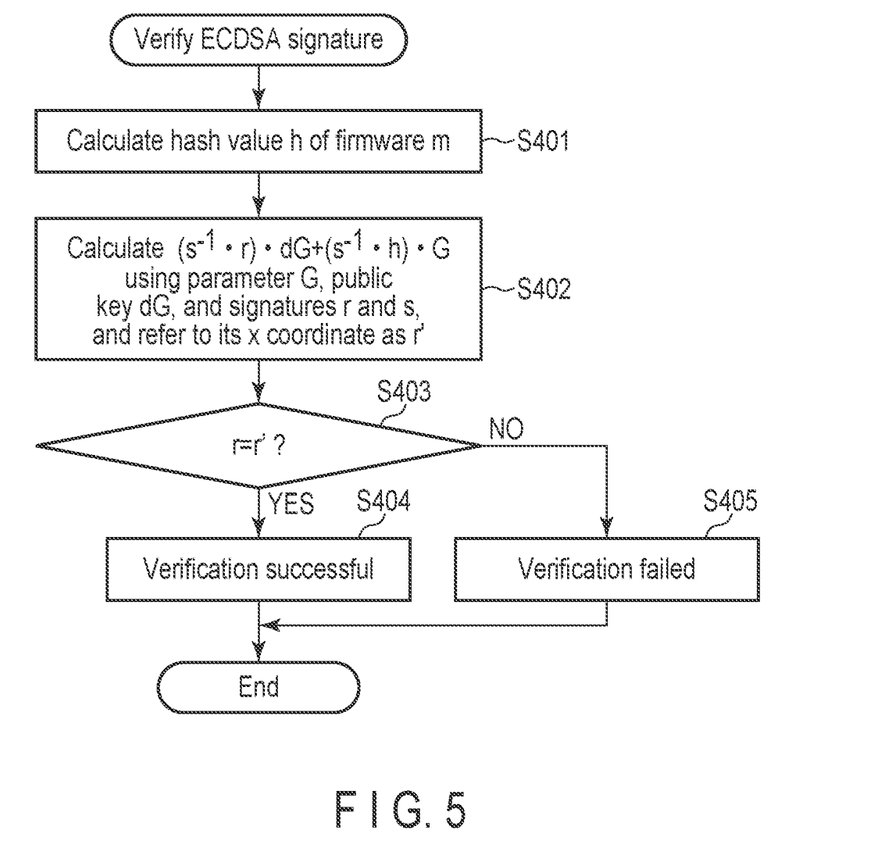
FIG. 5 is a flowchart showing the operation procedure at the time of verifying the ECDSA signature of the memory system according to the embodiment.

FIG. 5 is a flowchart showing the operation procedure at the time of verifying the ECDSA signature 203 of the memory system 1 of the embodiment. In other words, the flowchart is a flowchart showing the process flow of the hardware accelerator 14.

The hardware accelerator 14 calculates a hash value h of the firmware m (S401). The hardware accelerator 14 calculates $(s^{-1} \cdot r) \cdot dG + (s^{-1} \cdot h) \cdot G$ using the parameter G, public key dG, and signatures r and s, and refers to its x coordinate as r' (S402).

The hardware accelerator 14 determines whether or not r=r' (S403). If r=r' (S403: YES), the hardware accelerator 14 determines the verification as successful (S404). In contrast, if r is not r' (S403: NO), the hardware accelerator 14 determines that the verification fails (S405).

Figure 6:
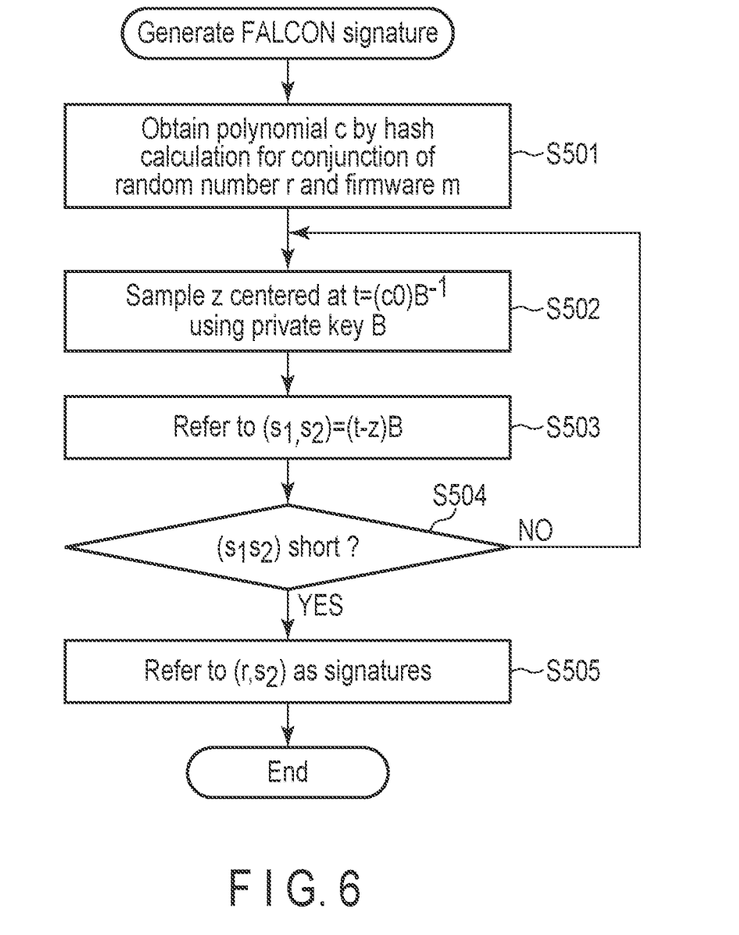
FIG. 6 is a flowchart showing a procedure for generating FALCON signature when a POC signature input by the memory system according to the embodiment is assumed to be a FALCON signature.

FIG. 6 is a flowchart showing the procedure for generating the FALCON signature in a case where the PQC signature 202 received by the memory system 1 of the embodiment is assumed to be a FALCON signature. The generation of the FALCON signature is performed by, for example, the computer that provides the firmware 201.

The FALCON signature generation device obtains a polynomial c by hash calculation for the conjunction of a random number r and firmware m (S501). The FALCON signature generation device samples z centered at $t=(c\ 0)B^{-1}$ using the private key B (S502). The FALCON signature generation device refers to $(s_1\ s_2)=(t-z)B$ (S503).

The FALCON signature generation device determines whether or not $(s_1\ s_2)$ is short (S504). If $(s_1\ s_2)$ is not short (S504: NO), the FALCON signature generation device returns to S502 and repeats the sampling. If $(s_1\ s_2)$ is short (S504: YES), the FALCON signature generation device refers to $(r, s_2)$ as the signatures (S505).

Figure 7:
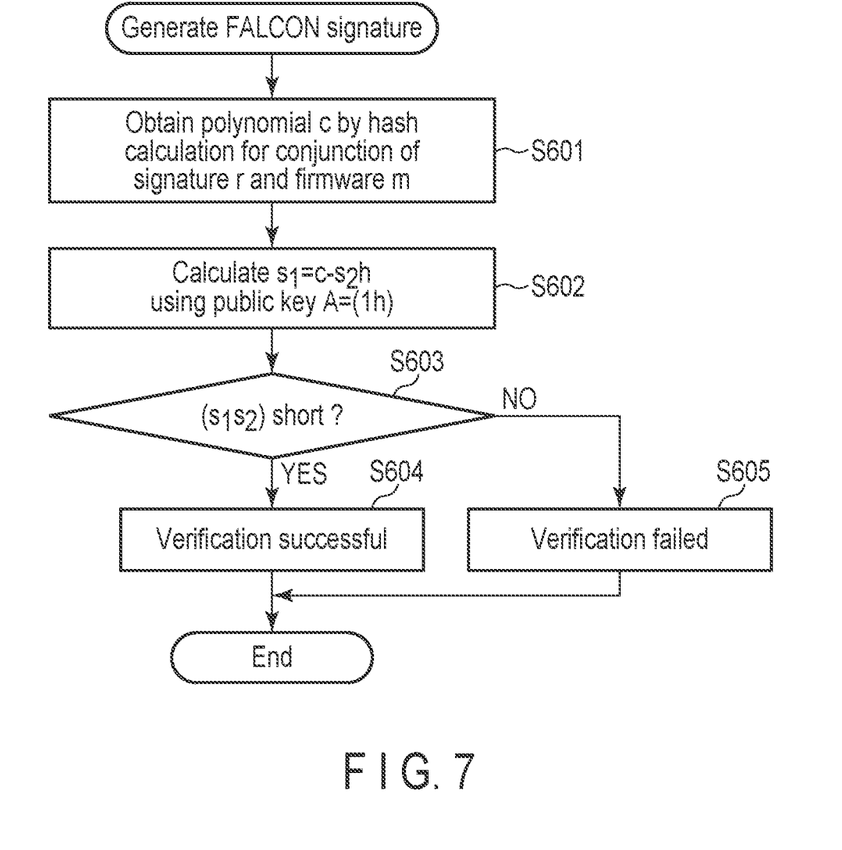
FIG. 7 is a flowchart showing an operation procedure at the time of verifying the FALCON signature (PQC signature) of the memory system according to the embodiment.

FIG. 7 is a flowchart showing the operation procedure at the time of verifying the FALCON signature (PQC signature 202) of the memory system 1 of the embodiment. In other words, the flowchart is a flowchart showing the process flow of the POC signature verifier 131.

The PQC signature verifier 131 obtains a polynomial c by hash calculation for the conjunction of signature r and firmware m (S601). The PQC signature verifier 131 calculates $s_1=c-s_2h$ using the public key $A=(1\ h)$ (S602).

The POC signature verifier 131 determines whether or not $(s_1\ s_2)$ is short (S603). If $(s_1\ s_2)$ is short (S603: YES), the PQC signature verifier 131 determines that the verification is successful (S404). In contrast, if $(s_1\ s_2)$ is not short (S603: NO), the PQC signature verifier 131 determines that the verification fails (S605).

As described above, although the memory system 1 of the embodiment includes only the hardware accelerator 14 that performs the signature verification with a digital signature inapplicable to the post-quantum cryptography, that is, does not include a hardware accelerator that performs signature verification with a digital signature applicable to the post-quantum cryptography, the memory system can attempt accelerating the signature verification of the firmware 201 at the power-on or resetting, for example, even after transitioning providing the firmware 201 via a network to the application to the post-quantum cryptography.

More specifically, faster signature verification can be performed on the hardware accelerator 14 by replacing the PQC signature 202 assigned to firmware 201 with the ECDSA signature 203 at the time of updating the firmware 201, which is not required to be faster. In addition, by encrypting the ECDSA signature 203 and the firmware 201 using the information inherent to the memory system 1 as the encryption key and storing them in the nonvolatile memory 20, attacks caused by the quantum computer can be prevented even if the digital signature applicable to the post-quantum cryptography is replaced with the digital signature inapplicable to the post-quantum cryptography.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A memory system comprising:
   a nonvolatile memory; and
   a controller configured to control the nonvolatile memory, wherein
   the controller comprises:
      a CPU; and
      an accelerator configured to perform signature verification using a first digital signature of a first signature scheme,
   when updating first firmware to which the first digital signature of the first signature scheme is assigned and which is stored in the nonvolatile memory to second firmware to which a second digital signature of a second signature scheme is assigned, the controller is configured to
      execute a program of performing signature verification with the second digital signature by the CPU to perform the signature verification of the second firmware based on the second digital signature assigned to the second firmware by the CPU,
      associate the first digital signature to the second firmware, and
      replace the second digital signature assigned to the second firmware with the associated first digital signature, and update the first firmware to the second firmware, and
   when booting the second firmware stored in the nonvolatile memory, the controller is configured to
      perform the signature verification of the second firmware based on the first digital signature assigned to the second firmware, by the accelerator, and
      perform the second firmware by the CPU.

2. The memory system of claim 1, wherein
   the first signature scheme is a signature scheme inapplicable to post-quantum cryptography, and
   the second signature scheme is a signature scheme applicable to post-quantum cryptography.

3. The memory system of claim 1, wherein
   the controller is configured to encrypt the first digital signature by common key cryptography by using information inherent to the memory system as an encryption key.

4. The memory system of claim 1, wherein
   the accelerator is configured to generate the first digital signature.

5. The memory system of claim 1, further comprising a second accelerator configured to generate the first digital signature.

6. The memory system of claim 1, wherein
   the controller is configured to perform a program of associating the first digital signature by the CPU to associate the first digital signature to the second firmware by the CPU.

7. The memory system of claim 1, wherein
   the first signature scheme is ECDSA signature or RSA signature.

8. A computer system comprising:
   a host; and
   a memory system connected to the host, wherein
   the memory system comprises
      a nonvolatile memory storing first firmware to which a first digital signature of a first signature scheme is assigned; and
      a controller including:
         a CPU; and
         an accelerator configured to perform signature verification using the first digital signature of a first signature scheme,
   the host transmits second firmware to the memory system, the second firmware being firmware to which a second digital signature of a second signature scheme is assigned,
   when updating the first firmware stored in the nonvolatile memory to the second firmware transmitted from the host, the controller is configured to
      execute a program of performing signature verification with the second digital signature by the CPU to perform the signature verification of the second firmware based on the second digital signature assigned to the second firmware by the CPU, associate the first digital signature to the second firmware, and replace the second digital signature assigned to the second firmware with the associated first digital signature, and update the first firmware to the second firmware, and when booting the second firmware stored in the nonvolatile memory, the controller is configured to perform the signature verification of the second firmware based on the first digital signature assigned to the second firmware, by the accelerator, and perform the second firmware by the CPU.

9. The computer system of claim 8, wherein the first signature scheme is a signature scheme inapplicable to post-quantum cryptography, and the second signature scheme is a signature scheme applicable to post-quantum cryptography.

10. The computer system of claim 8, wherein the controller is configured to encrypt the first digital signature by common key cryptography by using information inherent to the memory system as an encryption key.

11. The computer system of claim 8, wherein the accelerator is configured to generate the first digital signature.

12. The computer system of claim 8, further comprising a second accelerator configured to generate the first digital signature.

13. The computer system of claim 8, wherein the controller is configured to perform a program of associating the first digital signature by the CPU to associate the first digital signature to the second firmware by the CPU.

14. The computer system of claim 8, wherein the first signature scheme is ECDSA signature or RSA signature.

* * * * *